(No Model.)

O. H. JEWELL.
FILTER.

No. 423,430. Patented Mar. 18, 1890.

Witnesses
Harris W. Huehl
Otto Luebkert

Inventor
Omar H. Jewell
By Wm H. Lotz
Attorney

UNITED STATES PATENT OFFICE.

OMAR H. JEWELL, OF CHICAGO, ILLINOIS.

FILTER.

SPECIFICATION forming part of Letters Patent No. 423,430, dated March 18, 1890.

Application filed November 7, 1889. Serial No. 329,584. (No model.)

*To all whom it may concern:*

Be it known that I, OMAR H. JEWELL, a citizen of the United States of America, residing at Chicago, in the county of Cook and State of Illinois, have invented certain new and useful Improvements in Filters, of which the following is a specification, reference being had therein to the accompanying drawings.

This invention relates to apparatus for filtering water, and more particularly to filters in which the water will trickle through the filtering material by its own gravity; and it is my object to provide such an apparatus with a series of pipes in the bottom of the filtering material having strainer-cups for collecting and conducting away the purified water, or to force water through such pipes and strainers for producing an upward current through the filtering material for washing the same and for carrying all the impurities accumulated therein from the previous filtering of the water, and to provide in combination therewith devices for stirring the filtering material during the time an upward current is forced therethrough, for the purpose of more thoroughly separating the light and impure matter to be discharged by an overflow of the water; and with these objects in view my invention consists of the novel devices and combinations of devices hereinafter described and specifically claimed.

Figure 1:
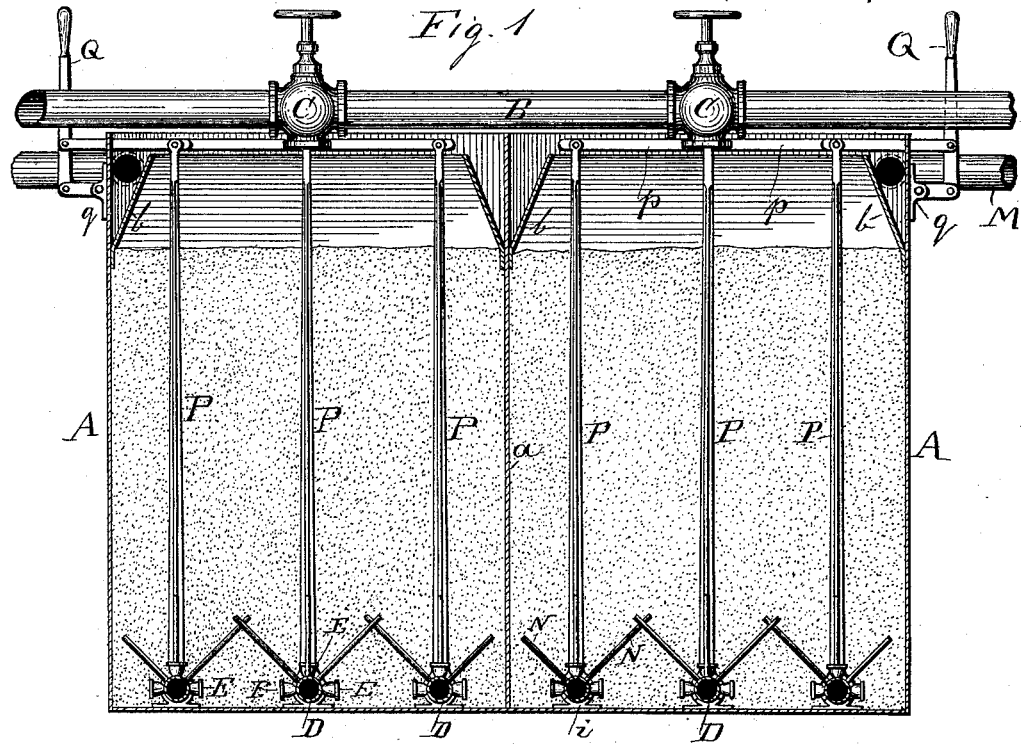
Figure 2:
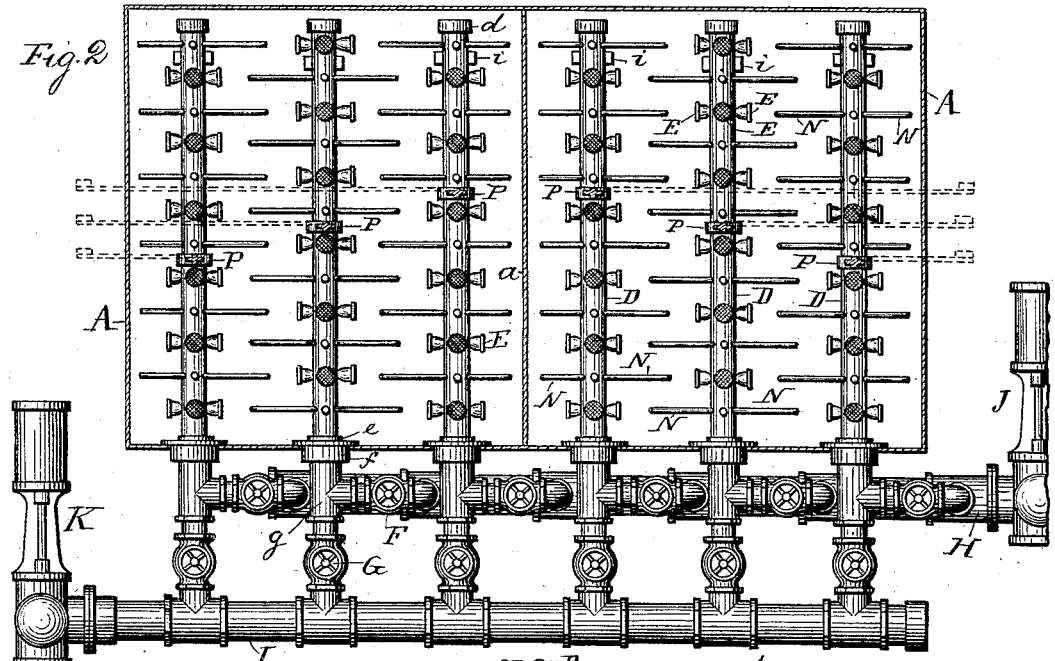
Figure 3:
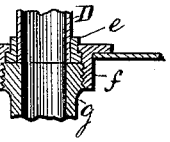

In the accompanying drawings, Figure 1 represents a longitudinal vertical section, and Fig. 2 a sectional plan, of my apparatus complete, and Fig. 3 is a section of one of the pivotal connections of the strainer-pipes with the main-pipe couplings.

Corresponding letters of reference in the several figures of the drawings designate like parts.

A denotes a double rectangular tank, divided in its middle by a partition $a$. These tanks may be of any desired length, and as many may be arranged side by side or placed separate and parallel with each other as may be required for filtering the required quantities of water. Longitudinally are arranged against the upper ends of the side walls and partitions of these tanks troughs $b$, for carrying off through suitable pipes M the overflow of wash-water, and transversely above these tanks A is placed a supply-pipe B, provided with valves C, one for each tank, for regulating the feed of water therein proportionally to the filtering capacity thereof, to keep these tanks filled without overflowing.

In the bottom of the several tanks are arranged a series of pipes D to be parallel with each other and placed equal distance apart, and extending nearly the entire length of these tanks, with their back ends closed by caps $d$, and each having tapped in its top and sides a series of strainer-cups E, covered at their mouths with wire screens or with finely-perforated sheet metal. Each pipe D to its forward end has rigidly coupled a ring $e$, with a square-edged spigot-flange, entering and abutting against an internal annular shoulder of a socket-coupling $f$, so as to be retained therein, which coupling $f$ has a flange secured against the inside of the wall of tank A by screws, bolts, or rivets to be rigid therewith, and with its cylindrical mouth projected through a hole in the tank, and internally screw-threaded for connecting the T-coupling $g$, all in a manner that pipes D thus coupled will form water-tight connections with T's $g$, and at the same time these pipes D will permit to be oscillated, for which purpose the rear ends of pipes D are supported in semicircular bearings $i$, secured upon the bottom of tanks A.

To each T $g$ are coupled two stop-valves F and G, all the valves F again being coupled with main pipe H, and all the valves G with main pipe I. The pipe H, intended for conducting the purified water, connects with a force-pump J, that again will convey the water where wanted, and the pipe I, connecting with another pump K, is only used for forcing water into the tank for washing out the impurities whenever this becomes necessary.

Intermediate of each two sets of strainer-cups E, the pipes D have secured three (more or less) radial arms N on relative angular positions to each other, with these arms of two adjacent pipes D in alternate order, and to each pipe D is also rigidly coupled an arm P, extending to the top of tanks A, where each by a bar $p$ is connected with a hand-lever Q, pivotally coupled by a link to an eye-plate $q$, which is rigidly secured against tanks A in a manner that a vibrating movement to such lever Q will impart an oscillating movement to pipe D and to arms N, thereby stirring the filtering material and creating a commotion therein, that during the time an upward current of water is forced through such filtering material will give the impurities therein a better chance to separate and to be carried off with the water, and with an overflow of the same into troughs $b$, and thence to be discharged through pipe M.

The operation of this filtering apparatus is as follows, to wit: The tanks A being filled with sand or fine gravel, or both mixed, and the valves G being shut and the valves F opened, water is supplied to these tanks from pipe B through valves C, which water will trickle through the filtering material, leaving behind all impurities contained therein, and after being thus purified the water will enter pipes D through strainer-cups E, and thence through valves F will enter pipe H, to be elevated or carried off by pump J. As the impurities from the water thus filtered accumulate on and in the filtering material, a washing out from time to time becomes necessary, for which purpose then the valves C and F are closed, and the valves G are opened and pump K is set in motion, forcing water into pipes D, which, escaping through strainers E, will rise upward in tank A, overflowing into troughs $b$, to be carried off by pipe M, and during the time an upward current is thus established the levers Q are operated for oscillating the arms P and N, for stirring the filtering material to allow the impurities collected therein to separate and to pass off with the water. The swinging of pipes D with arms P and N will be comparatively easy to operate, since the upward current will keep the sand and gravel in suspense, so the filtering material during this operation will be a liquid mass.

What I claim is—

1. The combination, with a filtering-tank, of pipes D in the bottom thereof, each provided with strainer-cups and with stirrer-arms, and each pivotally connected with a coupling communicating with the discharge and washout water-supply pipes through intermediate stop-valves, and connected with suitable devices for oscillating these pipes D and stirrer-arms, substantially as and for the purpose set forth.

2. The combination, with a filtering-tank A, of a series of pipes D in the bottom thereof, each pivotally connected with a coupling communicating with the discharge-pipe H, and the washout water-supply pipe I, through intermediate stop-valves F and G, and each pipe D provided with strainer-cups E and with radial arms N and with an arm P, connected with a lever Q, for oscillating such pipes D and arms N, all substantially as set forth.

In testimony whereof I affix my signature in presence of two witnesses.

OMAR H. JEWELL.

Witnesses:
WM. H. LOTZ,
OTTO LUEBKERT.